(12) United States Patent
Liberman

(10) Patent No.: US 10,155,677 B2
(45) Date of Patent: Dec. 18, 2018

(54) METHOD OF OPERATING A PRESSURE-RETARDED OSMOSIS PLANT

(71) Applicant: I.D.E. TECHNOLOGIES LTD., Kadima (IL)

(72) Inventor: Boris Liberman, Even Yehuda (IL)

(73) Assignee: I.D.E. TECHNOLOGIES LTD., Kadima (IL)

( * ) Notice: Subject to any disclaimer, the term of this patent is extended or adjusted under 35 U.S.C. 154(b) by 494 days.

(21) Appl. No.: 14/888,920

(22) PCT Filed: Jun. 2, 2014

(86) PCT No.: PCT/IB2014/061898
§ 371 (c)(1),
(2) Date: Nov. 3, 2015

(87) PCT Pub. No.: WO2014/195854
PCT Pub. Date: Dec. 11, 2014

(65) Prior Publication Data
US 2016/0083273 A1    Mar. 24, 2016

(30) Foreign Application Priority Data
Jun. 3, 2013    (GB) .................................. 1309873.6

(51) Int. Cl.
*C02F 1/44*    (2006.01)
*B01D 61/00*    (2006.01)
(Continued)

(52) U.S. Cl.
CPC ............ *C02F 1/441* (2013.01); *B01D 61/002* (2013.01); *B01D 65/02* (2013.01); *C02F 1/445* (2013.01);
(Continued)

(58) Field of Classification Search
CPC ...... C02F 1/441; C02F 1/445; C02F 2303/10; C02F 2301/08; C02F 2209/44;
(Continued)

(56) References Cited

U.S. PATENT DOCUMENTS

2006/0144789 A1    7/2006  Cath et al.
2007/0181497 A1*   8/2007  Liberman ............ B01D 61/025
                                                           210/636
(Continued)

FOREIGN PATENT DOCUMENTS

NO    2007073207 A1      6/2007
WO    WO-2011064731 A1 * 6/2011    ........... B01D 61/002

OTHER PUBLICATIONS

ISR and WO as issued in PCT/IB/2014/061898 dated Sep. 26, 2014.

*Primary Examiner* — David C Mellon
(74) *Attorney, Agent, or Firm* — Symbus Law Group, LLC; Clifford D. Hyra

(57) ABSTRACT

A method of operating a pressure-retarded osmosis plant, the plant comprising at least one osmosis element having a semi-permeable membrane, the semi-permeable membrane defining a feed side and a permeate side of the osmosis element, the method comprising, in a first mode of operation, supplying a feed stream having a relatively high concentration of solute to the feed side, supplying a permeate stream having a relatively low concentration of solute to an inlet of the permeate side, and receiving a feed outlet stream from the feed side wherein permeate has passed through the semi-permeable membrane from the permeate side to the feed side, in a second mode of operation, supplying a backwash stream having a relatively low concentration to the feed side of the osmosis element such that water passes through the semi-permeable membrane, and receiving a permeate outlet stream from an outlet of the permeate side, the method further comprising alternately (Continued)

performing the first mode of operation, to perform a production step, and performing the second mode of operation, to reduce fouling of the semi-permeable membrane.

16 Claims, 9 Drawing Sheets

(51) Int. Cl.
    *B01D 65/02*     (2006.01)
    *C02F 103/08*     (2006.01)

(52) U.S. Cl.
    CPC ...... *B01D 2313/24* (2013.01); *B01D 2315/20* (2013.01); *B01D 2317/04* (2013.01); *B01D 2319/02* (2013.01); *B01D 2321/04* (2013.01); *B01D 2321/2083* (2013.01); *B01D 2321/40* (2013.01); *C02F 2103/08* (2013.01); *C02F 2209/005* (2013.01); *C02F 2209/44* (2013.01); *C02F 2301/08* (2013.01); *C02F 2303/10* (2013.01); *C02F 2303/16* (2013.01); *Y02A 20/131* (2018.01); *Y02E 10/28* (2013.01); *Y02W 10/30* (2015.05)

(58) Field of Classification Search
    CPC ............ C02F 2209/005; C02F 2103/08; C02F 2303/16; B01D 61/002; B01D 65/02; B01D 2317/04; B01D 2319/02; B01D 2313/24; B01D 2321/40; B01D 2321/04; B01D 2321/2083; B01D 2315/20; Y02A 20/131; Y02E 10/28; Y02W 10/30

See application file for complete search history.

(56) References Cited

U.S. PATENT DOCUMENTS

| | | | |
|---|---|---|---|
| 2009/0008330 A1* | 1/2009 | Thorsen | B01D 61/002 210/636 |
| 2009/0071902 A1* | 3/2009 | Stover | B01D 61/022 210/637 |
| 2010/0192575 A1* | 8/2010 | Al-Mayahi | B01D 61/002 60/671 |
| 2012/0285886 A1 | 11/2012 | Liberman | |

* cited by examiner

METHOD OF OPERATING A PRESSURE-RETARDED OSMOSIS PLANT

FIELD OF THE INVENTION

This invention relates to a method of operating a pressure-retarded osmosis plant, particularly but not exclusively for use in power generation.

BACKGROUND OF THE INVENTION

Osmosis is a known phenomenon in which water moves across a semi-permeable membrane between solutions with lesser and greater concentrations. In forward osmosis ('FO'), where the hydraulic pressure difference of the solutions is zero, the water moves from the lower concentration solution to the higher concentration solution. In pressure-retarded osmosis ('PRO'), where hydraulic pressure is applied to the higher concentration solution in an amount which is greater than zero and lower than the osmotic pressure difference of the solutions, the rate of flux of water can be reduced. If sufficient pressure is applied to the higher concentration side, which is greater than the osmotic pressure differences of the solutions, osmotic water flow can be reversed, referred to as reverse osmosis ('RO') and water caused to move across the semi-permeable membrane from the higher to the lower concentration solution (flux reversal point). These techniques have found use in a number of fields, including water treatment and desalination. Pressure-retarded osmosis has also been applied in power generation, where the osmotic pressure difference between seawater or concentrated brine, and fresh water is converted into hydrostatic pressure in a saltwater solution, and the increased hydrostatic pressure is used to drive a turbine. The general equation describing water flux in osmotic-driven membrane process in FO, RO and PRO is $Jw=A(\sigma\Delta\pi-\Delta P)$ where $Jw$ is the water flux, $A$ the water permeability constant of the membrane, $\sigma$ the reflection coefficient, and $\Delta P$ is the applied pressure. For FO, $\Delta P$ is zero, for RO, $\Delta P > \Delta\pi$ and for PRO, $\Delta\pi > \Delta P$.

One common element for all of the above mentioned osmotic technologies is the use of a semi-permeable membrane which allows the passage of water across it but rejects most solute molecules or ions. A persistent problem with known osmosis systems is that of fouling of the semi-permeable membrane. Membrane fouling refers to the potential deposition and accumulation of constituents in the feed stream on the membrane surface and it is usually classified into four major types: colloidal fouling, organic fouling, inorganic fouling/scaling and biofouling. Membrane fouling is a global issue, which limits the membrane operating flux, increases power consumption and requires periodical membrane cleaning-in-place (CIP) procedures. This may result in low effectiveness and high cost, and adds environmental issues related to the CIP chemical solutions disposal. Various preventing and cleaning strategies have been developed based on the understanding of the different factors affecting the fouling process. There is a consensus that membrane cleaning is the long term solution to remove foulants and maintain membrane performance. Cleaning methods include chemical and physical methods. Chemical cleaning is used more widely, however it has huge disadvantages due to system down time which stops production, high costs, environmental issues related to waste chemical disposal and it reduces membrane life time.

For the last few decades pressure-driven processes, such as RO, have been dominant. Several emerging applications based on FO may outperform RO both economically and environmentally. Among them PRO which is a derivative process of FO and may provide a clean and renewable source of energy. FO uses the osmotic pressure gradient ($\Delta\pi$) to drive water transport through the membrane. In reality, the effective $\Delta\pi$ across the membrane is much lower than the bulk osmotic pressure differences due to membrane orientation and membrane-associated transport phenomena—external and internal concentration polarization. External concentration polarization (ECP) has a single component in pressure-driven membrane processes, referred to as concentrative ECP and is located on the feed side of the active layer. During osmosis-driven membrane process concentrative ECP is followed by dilutive ECP. Both concentrative and dilutive ECP phenomena reduce the effective, net, osmotic driving force. FO is characterized in relatively low permeate flow and therefore the effect of external polarization is relatively low.

The semi-permeable membrane is asymmetric and has a dense active ion-rejecting layer supported by a porous layer. When a draw solution is against the active layer there is only ECP. However when the draw solution is against the porous supporting layer, a dilutive internal concentration polarization (ICP) occurs. An opposite membrane orientation, in which draw solution is placed against the active layer and feed solution against the porous support layer a concentrative IPC occurs. The effect of ICP is detrimental and it reduces the effective, net, driving force between the two solutions.

As stated above, fouling process is a multi-factorial process. The flow configuration of the membrane process may also affect the fouling process. There are two main flow configurations of membrane processes: cross-flow and dead-end filtration. In cross-flow filtration the feed flow is tangential to the surface of membrane, while permeate is directed normal to the membrane surface. In dead-end filtration the direction of the fluid flow is normal to the membrane surface. Dead-end filtration is usually a batch-type process, where all the filtering solution is fed into a membrane device, which then allows passage of some particles subject to the driving force. The main disadvantage of dead end filtration is the extensive membrane fouling and concentration polarization. The fouling is usually induced faster at higher driving forces and water flux. The unidirectional characteristic of dead-end filtration lacks any internal membrane cleaning effects and it comes to a complete stop once the membrane is fully clogged. Tangential flow devices are more cost and labour intensive, but they are less susceptible to fouling due to the sweeping effects and high shear rates of the passing flow. In an RO process the feed goes through a cross flow configuration while in FO and PRO the draw solution goes through a cross flow configuration and the feed solution passes through dead-end filtration. As such, at high feed stream, a PRO system would be very prone to dead-end fouling effects and due to cleaning requirements will have to work in batches with prolonged down times.

U.S. Pat. No. 7,658,852 to Liberman teaches an on-line direct osmosis cleaning waves by discharging pulses of high salinity solution ('DO-HS') along the feed water stream in an RO system as a better alternative to known CIP processes. DO-HS cleaning does not interrupt the operational process of the system. The cleaning wave reverses locally the RO process into a FO process and effectively activates four synergetic cleaning effects within a short time frame of about 20 seconds: (1) fouling lifting; (2) fouling sweeping; (3) bio-osmotic shock; and (4) salt dissolve shock. The cleaning wave creates a local effect of backwash stream through the membrane by instantaneously switching the cross flow into a dead-end flow. This local effect propagates in a wave pattern along the membrane so that the entire membrane is cleaned.

U.S. Pat. No. 4,033,878 to Foreman and U.S. Pat. No. 8,354,026 to Herron teach PRO systems which use proprietary membrane structure and system design. Amongst other things, these patents teach a system which allow cross flow configuration both for the draw solution and the feed solution. In addition, special spiral membrane design is required to allow FO to take place as standard RO spiral membrane structure does not allow feed solution in FO to flow in the envelop. These patents do not teach any cleaning effects and therefore are susceptible to system down time for cleaning and maintenance.

There is a need to develop a PRO system which can practice standard spiral membranes and can work continuously with minimal interruptions based on reliable internal cleaning process to minimize the down time periods and maximize efficiency.

SUMMARY OF THE INVENTION

According to the present invention there is provided a method of operating a pressure reduced osmosis plant, the plant comprising at least one osmosis element having a semi-permeable membrane, the semi-permeable membrane defining a feed side and a permeate side of the osmosis element, the method comprising, in a first mode of operation, supplying a feed stream having a relatively high concentration of solute to the feed side in a cross flow configuration, supplying a permeate stream having a relatively low concentration of solute to an inlet of the permeate side in a dead end filtration flow configuration, and receiving a feed outlet stream from the feed side wherein permeate has passed through the semi-permeable membrane from the permeate side to the feed side, in a second mode of operation, supplying a pulse of backwash stream having a relatively low concentration to the feed side of the osmosis element in a cross flow configuration such that water flow direction is reversed and passes through the semi-permeable membrane from the feed side to the permeate side, and receiving a permeate outlet stream from an outlet of the permeate side, the method further comprising alternately performing the first mode of operation, to perform a production step, and performing the second mode of operation, to reverse the flow across the membrane and to perform a backwash step to reduce fouling of the semi-permeable membrane.

In the second mode of operation, the supply of backwash stream having a relatively low concentration to the feed side may comprise mixing the feed stream having a relatively high concentration with a diluting stream having a relatively low concentration to produce the backwash stream having a low concentration.

The method may comprise closing the feed outlet in the second mode of operation.

The backwash stream may be supplied from one or both of the feed inlet and the feed outlet.

The first mode of operation, during a production step, may have a duration in the range 200 sec to 300 sec and the second mode of operation, during a backwash step, may have a duration in the range of 20 sec to 30 sec.

The gauge pressure of the feed steam and the gauge pressure of the backwash stream may be approximately equal.

The gauge pressure of the feed stream and the osmotic pressure of the feed stream may be approximately equal.

The gauge pressure of the feed stream may be higher than the gauge pressure of the permeate stream to insure mechanical integrity of the membrane.

The plant may comprise a plurality of osmosis elements.

The feed outlet of a first element may be connected to a feed inlet of a second element.

The method may comprise supplying a separate permeate stream to each of said elements.

The gauge pressures of the separate permeate streams may be different.

The plurality of osmosis elements may be disposed in a pressure vessel.

The plant may comprise a plurality of pressure vessels, the method comprising operating the plant such that some of the pressure vessels are operating in the first production mode of operation and some of the pressure vessels are operating in the second backwash mode of operation.

The method may further comprise generating power by supplying a feed outlet stream from the feed outlet when the osmosis element is in the first mode of operation to a turbine.

BRIEF DESCRIPTION OF THE DRAWINGS

Embodiments of the present invention are now described by way of example only with reference to the accompanying drawings wherein.

DETAILED DESCRIPTION OF THE PREFERRED EMBODIMENTS

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated n the drawings. The invention is applicable to other embodiments or of being practiced or carried out in various ways. Also, it is to be understood that the phraseology and terminology employed herein is for the purpose of description and should not be regarded as limiting.

Figure 1:
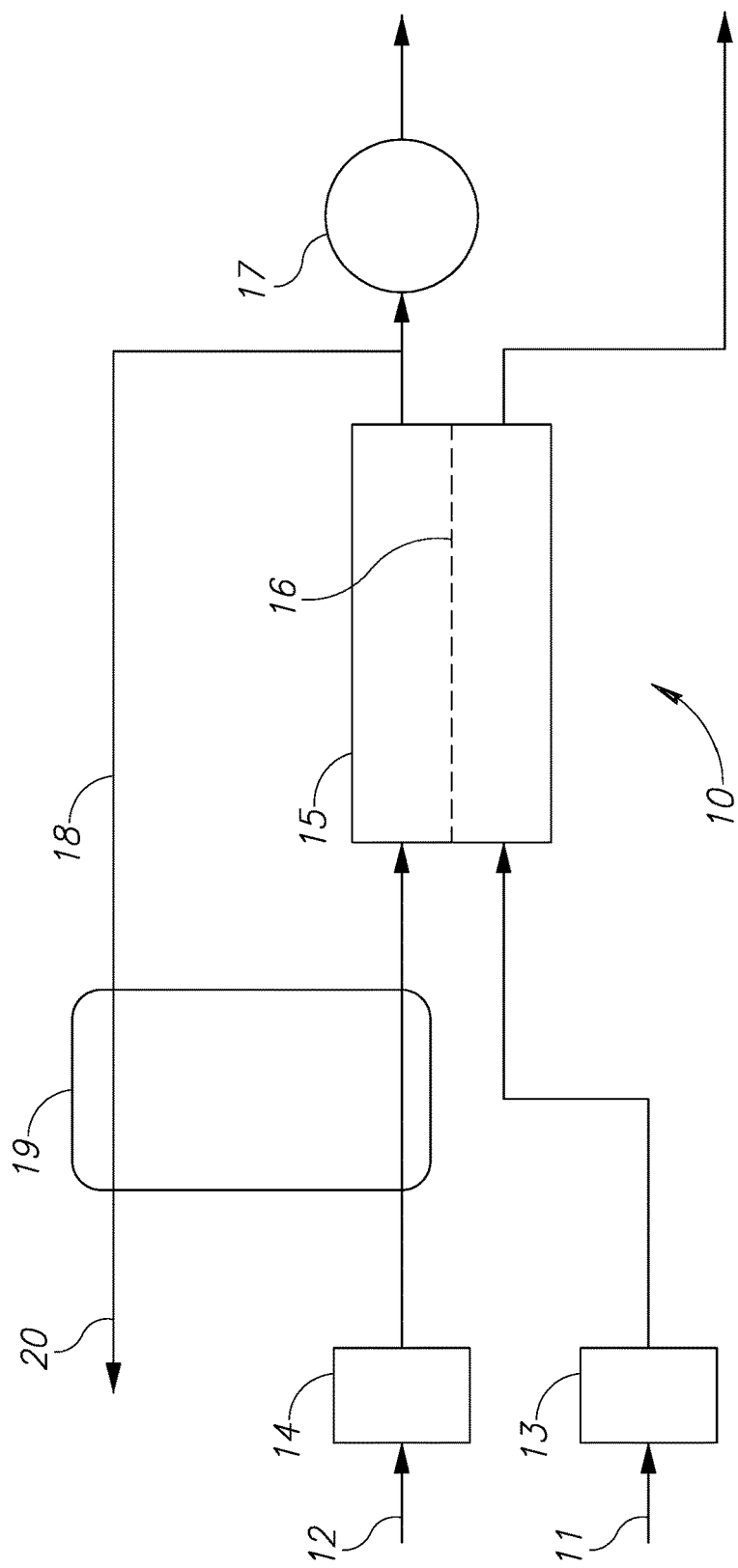
FIG. 1 is a diagrammatic illustration of a PRO power plant.

Referring now to FIG. 1, a diagrammatic illustration of a prior art PRO power plant is shown at 10. Fresh water and sea water are introduced at feed 11, 12, respectively, and pre-treated in appropriate pre-treatment elements 13, 14. The pre-treated sea water and fresh water is supplied to an osmosis element 15, where water from the fresh water stream passes through membrane 16 into the sea water stream, increasing the excess hydraulic pressure in the sea water stream. About one third of the pressurized sea water stream is supplied to a turbine 17, and about two thirds is returned as shown by connection 18 to a pressure exchanger 19, where the input sea water feed is pressurized. The resulting brackish water is discharged as shown at 20.

Figure 2:
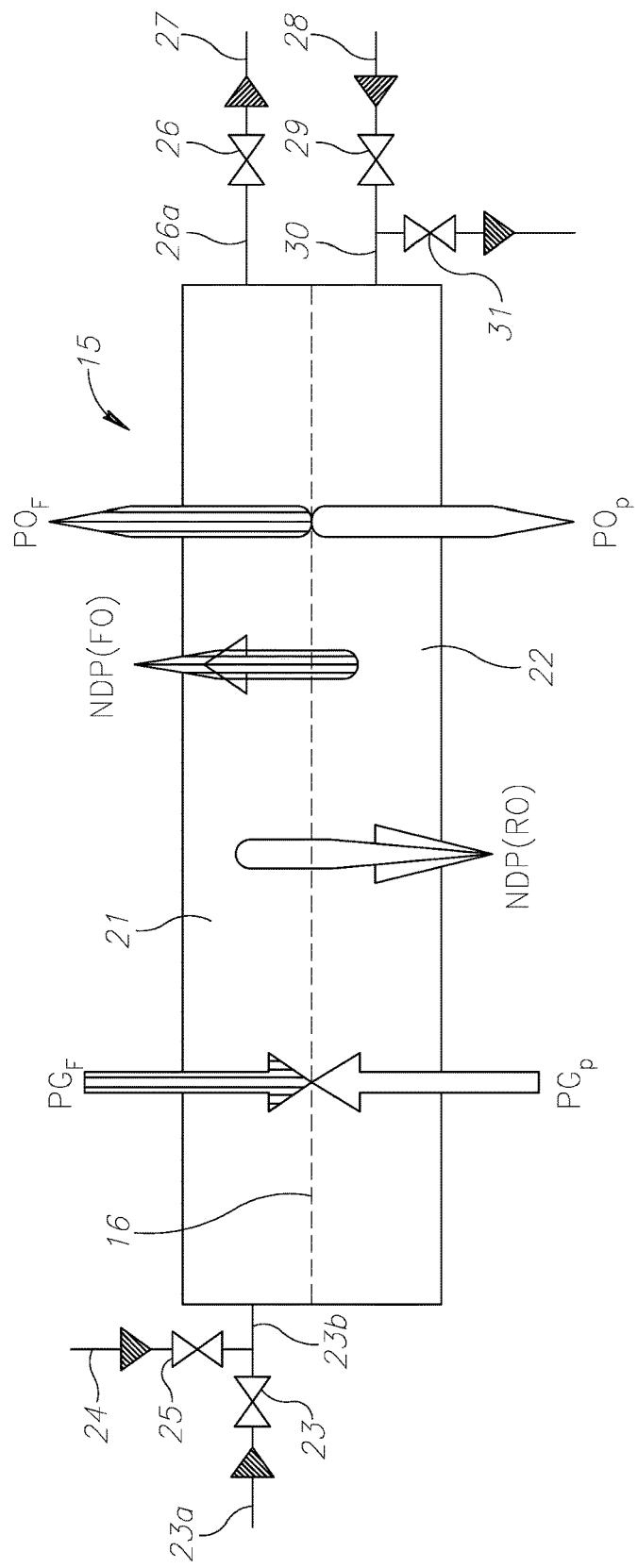
FIG. 2 is a diagrammatic view of an osmosis element embodying the present invention.

Referring now to FIG. 2, an osmosis element is shown in more detail generally at 15. The semi-permeable membrane generally shown at 16 divides the osmosis element into two sides, a feed side 21 and a permeate side 22. It should be noted that FIG. 2 is strictly diagrammatic. In practice, the osmosis element 15 comprises a spiral-wrapped element in which a multi-layer semi-permeable membrane is wrapped around a hollow central tube and contained within a pressure vessel, for example as described above. The system is presented in very much simpler form in FIG. 2 for clarity in describing the essential functions of the invention.

To supply the feed side 21, a feed stream is generally shown at 23a, controllable as illustrated by the diagrammatic valve connection at 23 for connection to feed side inlet 23b. A backwash feed stream is generally shown at 24 controllable by valve 25. A feed outlet valve is shown at 26 to produce a feed outlet stream 27. Conventionally, the inlet and outlet are located at opposite ends of the osmosis element 15 so that supplied feed water passes along the length of the osmosis element. To supply permeate to the permeate side 22 of the osmosis element 15, a permeate stream is generally shown at 28 controllable by a valve 29 to supply a permeate inlet 30. To provide a permeate outlet, an outlet valve is generally shown at 31. Preferably pressure sensors are provided to monitor pressures within the osmosis element 15. The feed stream may comprise sea water and the permeate stream may comprise fresh water.

The direction of flow across the permeate membrane depends on the balance of gauge pressure and osmotic pressure on each side of the membrane, the balance of the pressure, the net driving pressure ("NDP") is given by $$NDP=PG_F-PO_F-PG_P+PO_P$$

where $PG_F$ is the gauge pressure of the feed solution, $PO_F$ is the osmotic pressure of the feed solution, $PG_P$ is the gauge pressure of the permeate feed, and $PO_P$ is the osmotic pressure of the permeate feed. If the NDP is positive, then reverse osmosis occurs and permeate passes from the feed side 21 to the permeate side 22. If the NDP is negative, then forward osmosis occurs and permeate passes from the permeate side 22 across the semi-permeable membrane 16 and into the feed side 21.

Figure 3:
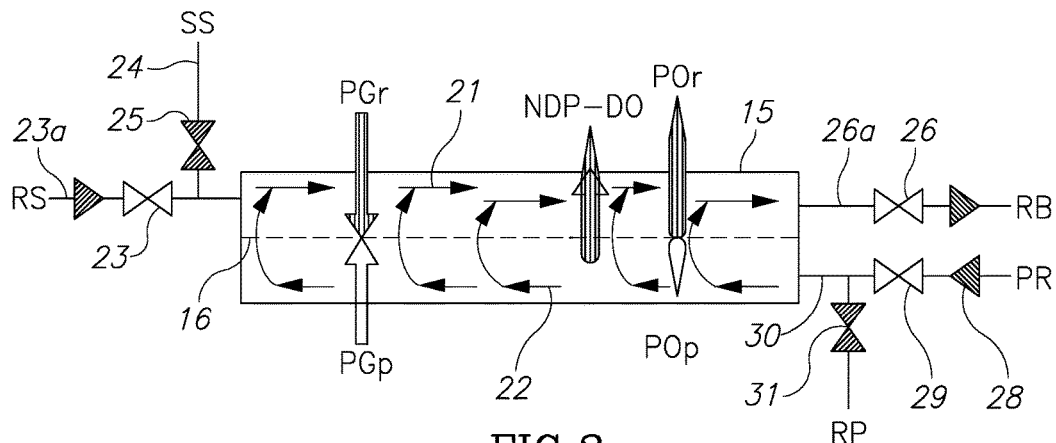
FIG. 3 is a diagrammatic illustration of the osmosis element of FIG. 2 in a first mode of operation.

The osmosis element may be operated in two modes of operation. As illustrated in FIG. 3, in the first mode of operation, also referred to as the production step, a forward osmosis or pressure reduced osmosis occurs and the increased pressure used in power production. The valves 23 and 26 are open so that feed flows in a cross flow configuration and valve 25 is closed. Accordingly, the feed stream supplies a feed having a relatively high concentration of dissolved solids to the feed side 21, such that it passes along the length of the osmosis element 15 in a cross flow configuration and leaves through a feed outlet 26a and valve 26. Permeate, comprising a relatively low concentration solution, is provided from the permeate stream 28, through open valve 29 and into inlet 30. It will be apparent that there is no outlet from the permeate side 22, such that all permeate supplied into the feed side 22 passes through the semi-permeable membrane 16 and into the feed side 21 in a dead-end filtration flow configuration. Accordingly, a stream comprising a solution having a reduced concentration at high pressure is supplied from the feed outlet 26a and may be used for power production as discussed above. Ideally, the feed gauge and osmotic pressures should be kept approximately equal, so that $PG_F \approx PO_F$. To avoid mechanical stress on the membrane and keep its integrity, the gauge pressure at the feed side of the membrane should be higher than the gauge pressure at the permeate side of the membrane, i.e. $PG_F > PG_P$.

In this mode, as the semi-permeable membrane 16 is gradually fouled due to external and internal concentration polarization, the balance of the osmotic pressures across the membrane reduces, thus reducing the net driving pressure and water flux. If the first mode of operation is performed for long enough, eventually, due to the dead end characteristic of the permeate flow configuration and its associated concentration polarization effects, diffusion of water across the semi-permeable membrane 16 will stop. The pressures within the osmosis element 15 can be monitored to detect when the NDP has fallen to a threshold level indicating fouling of the semi-permeable membrane 16, and the osmosis element switched to a second mode of operation.

Figure 4:
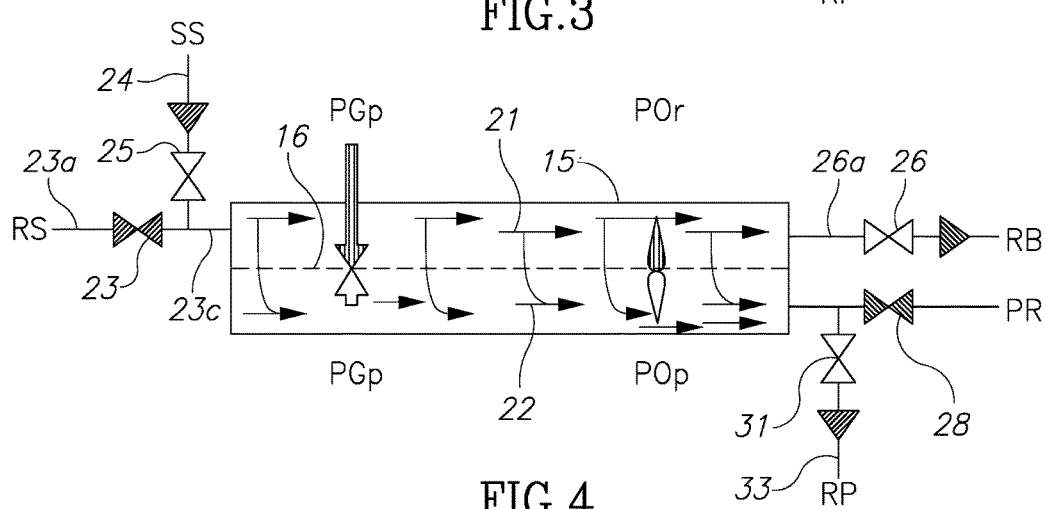
FIG. 4 is a diagrammatic illustration of the osmosis element of FIG. 2 in a second mode of operation.

Accordingly, to overcome this problem, the second mode of operation, which is a backwash step, is performed as illustrated in FIG. 4. Valve 23 is closed and valve 25 opened. In this example, valve 26 is also open and valve 31 opened. Valve 28 is closed. Accordingly, and based on this valve configuration, a backwash feed stream 24 supplies a stream of in this example pressurised saline having a relatively low concentration compared to the feed stream 23a, into the feed side 21 of the osmosis element 15 in a cross flow configuration. No permeate is supplied to the permeate side 22, as valve 28 is closed. Valve 31 is open so that permeate may be drained out from permeate side 22 through inlet 30 which now operates as an outlet. Referring to the NDP in this mode of operation, $$NDP=PG_B-PO_B-PG_P+PO_P$$

where $PG_B$ is the gauge pressure of the backwash feed and $PO_B$ is the osmotic pressure of the backwash feed. To simplify the transition between the first and second modes of operation, preferably $PG_F \approx PG_B$. $PO_B$ may be equal to or lower than $PO_P$ in the first mode of operation. $PG_P$ will also be much lower as no permeate is supplied to the permeate side and only drained out through outlet 30 and open valve 31. $PO_P$ may effectively be relatively high as the result of the fouling and strong concentration polarization.

Accordingly, at this second, backwash, step, the water flow across the membrane is reversed and will now flow from the relatively low concentration backwash feed side across the semi-permeable membrane 16 into permeate side 22. The reversed flow of water through the semi-permeable membrane 16 will remove, by washing out or otherwise, solute ions and other fouling material trapped in the semi-permeable membrane and at its surface, and the resulting permeate passes through valve 31 and permeate outlet 33. Cross flow of the backwash feed 24 from the inlet 23a to the outlet 26a will also remove solute ions from the feed side surface of the semi-permeable membrane 16 by turbulences and sheer forces. As the gauge pressure on the permeate side 22 is lower than that of the feed side 21, then even if the osmotic pressures of the backwash saline solution and permeate are approximately equal osmosis will still occur across the semi-permeable membrane in a reverse direction to activate membrane cleaning mechanisms. The pressures in the osmosis elements 15 can be monitored, and the second mode of operation may end when the osmotic pressure at the permeate side falls to a desired level. The valves can be operated to supply a feed stream and permeate stream to the osmosis element as described above and the first mode of operation resumed. To optimise operation of the second mode of operation, the gauge pressure and/or osmotic pressure of the backwash stream may be varied as needed.

Figure 5:
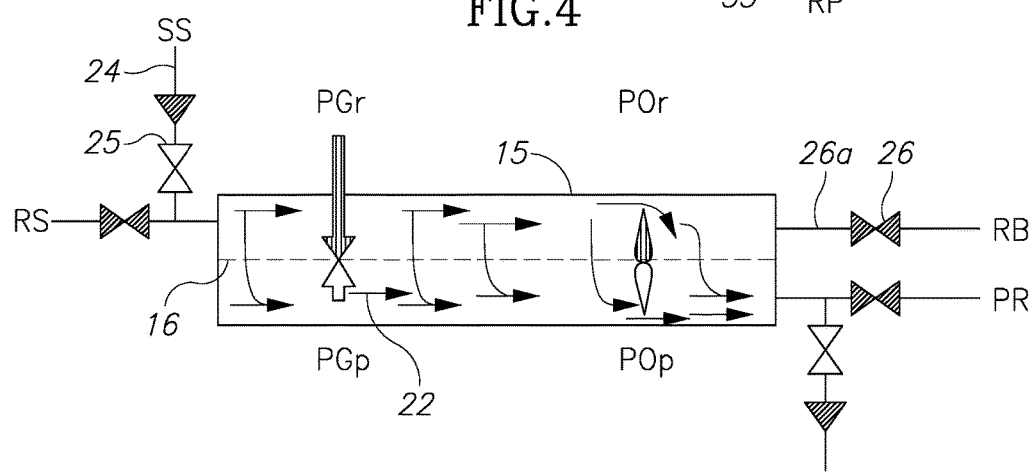
FIG. 5 is a diagrammatic illustration of the osmosis element of FIG. 2 in an alternative second mode of operation.

In an alternative second mode of operation as shown in FIG. 5, valve 26 is also closed so that none of the backwash feed 24 can pass through feed outlet 26a. In this alternative, all of the backwash feed 24 must pass through the semi-permeable membrane 16 and into the permeate side 22 in a dead end flow configuration, thus removing ions from the semi-permeable membrane at the permeate side 22 of the semi-permeable membrane 16. This alternative may be desirable in circumstances when, for example, the osmosis element 15 is the last in a train of osmosis elements as discussed below.

In a further alternative, valves 23 and 25 may both be opened, such that the feed stream and backwash feed stream 24 are both supplied to feed side 21, resulting in a supplied stream that has a lower concentration than that of the feed stream 23a. As a yet further alternative, the backwash stream may be supplied at both the inlet and outlet of the feed side 21. The backwash stream may be essentially the same as the permeate stream.

If desired, other cleaning additives may be included in the backwash feed 24 to improve cleaning or other maintenance of the semi-permeable membrane 16.

Figure 6:
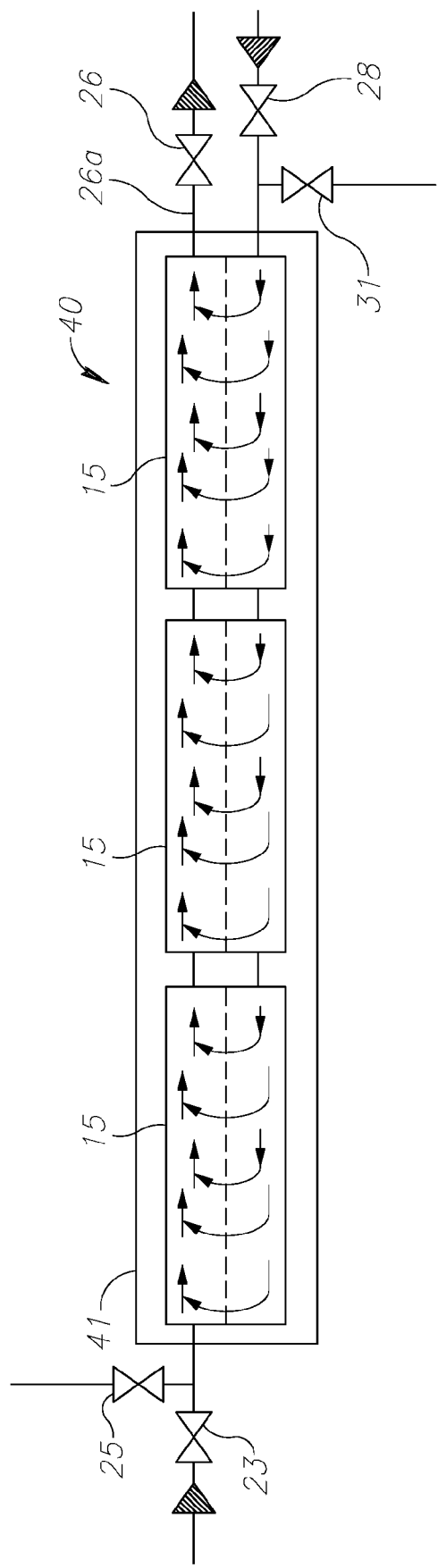
FIG. 6 is a diagrammatic illustration of a plurality of osmosis elements of FIG. 2 in a common pressure vessel.
Figure 7:
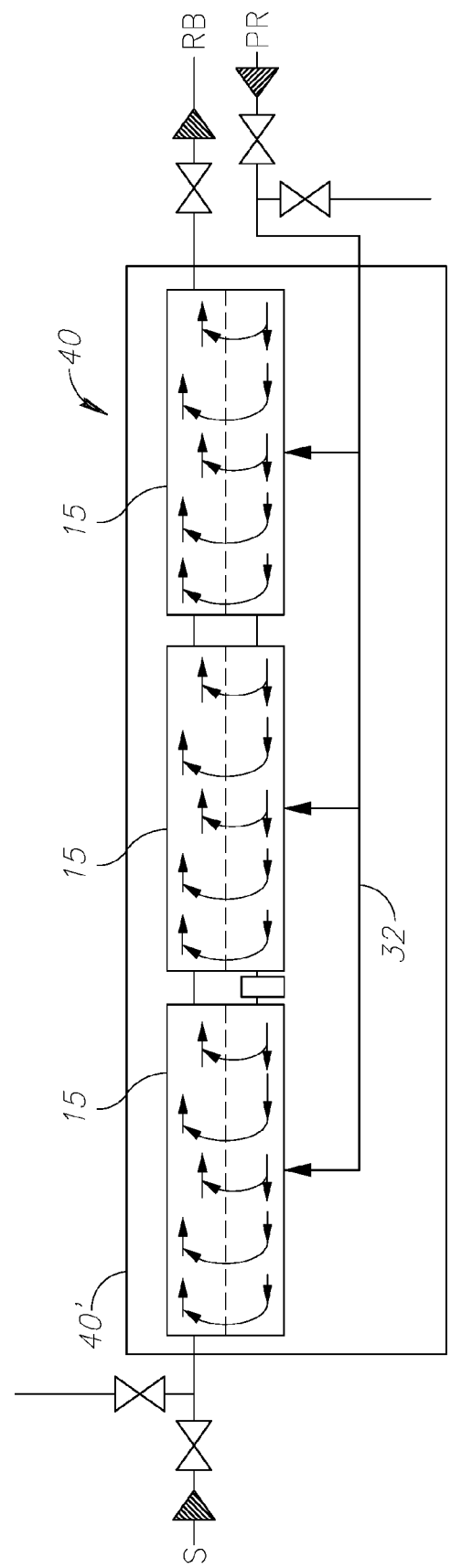
FIG. 7 is an embodiment similar to FIG. 6 with an alternative permeate supply.
Figure 8:
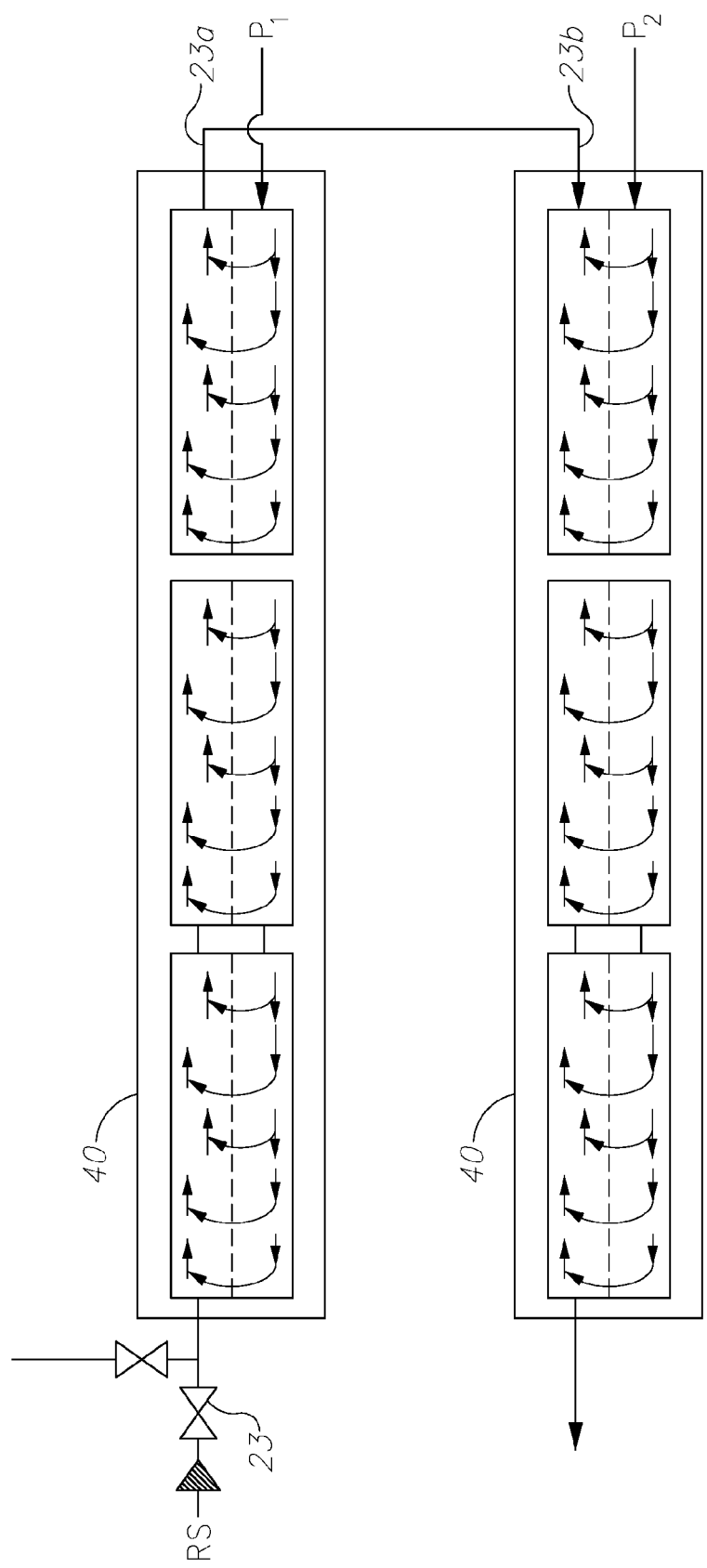
FIG. 8 is a diagrammatic illustration of two connected elements of FIG. 6

Referring now to FIG. 6, a group including a plurality of osmosis elements is shown at 40. The group 40 has a pressure vessel 41 within which a plurality of osmosis element 15 are mounted. The group 40 has a common set of valves 23, 25, 26, 28, 31, to supply each of the osmosis elements 15. The osmosis elements 15 are connected in serial and the system as whole may be operated as discussed above with reference to FIG. 2 to FIG. 5. In an alternative configuration shown at 40' in FIG. 7, permeate supply 32 may be connected separately to each osmosis element 15, and the pressure of the permeate stream at each element 15 may be separately controllable to accommodate the different osmotic pressure of the feed stream in each successive osmosis element 15. A combination of groups 40 of FIG. 6 are shown in combination in FIG. 8, where the feed outlet 26a of one group is connected to the feed side inlet 23b of a second group 40. Separate permeate streams $P_1P_2$ allow permeate to be supplied at different pressures or concentrations to different groups 40.

Figure 9:
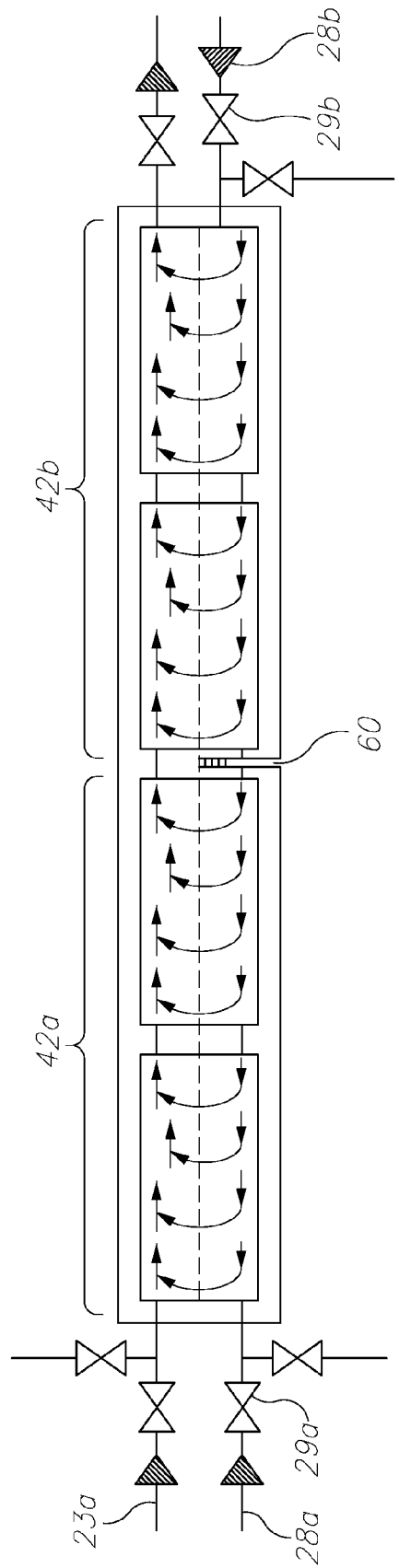
FIG. 9 is an embodiment similar to FIG. 6 with a further alternative permeate supply.
Figure 9A:
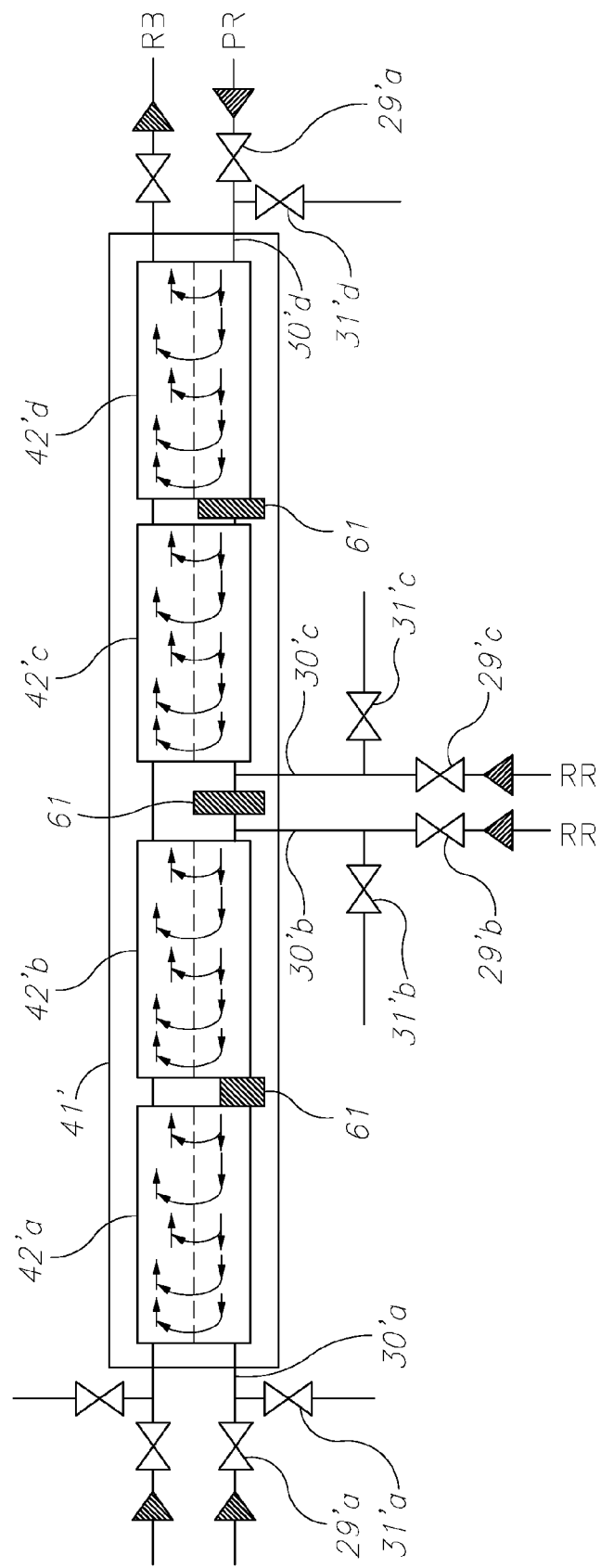
FIG. 9a is an embodiment similar to FIG. 6 with a yet further alternative permeate supply.

Further alternatively, as shown in FIG. 9, a pressure vessel 41 is divided into two sub-groups 42a, 42b by permeate stopper 60, each having separate permeate streams 28a, 28b controllable through valves 29a, 29b respectively but with a common feed stream 23a. In this way, permeate at different pressures and/or concentrations can be supplied to the upstream and downstream groups 42a, 42b in accordance with the different osmotic pressures on the feed side 22 of each osmosis element 15. A further alternative is shown in FIG. 9a, in which a pressure vessel 41' comprises four subgroups diagrammatic shown at 42'a, 42'b, 42'c and 42'c, separated by permeate stoppers 61. Each subgroup has a separate inlet 30'a, 30'b, 30'c, 30'd, with associated valves 29'a-d, 31'a-d. Accordingly each subgroup 42'a-d may be operated as described above, and supplied with a permeate stream at different pressures (for example 2, 4, 6 and 8 bar respectively).

Figure 10:
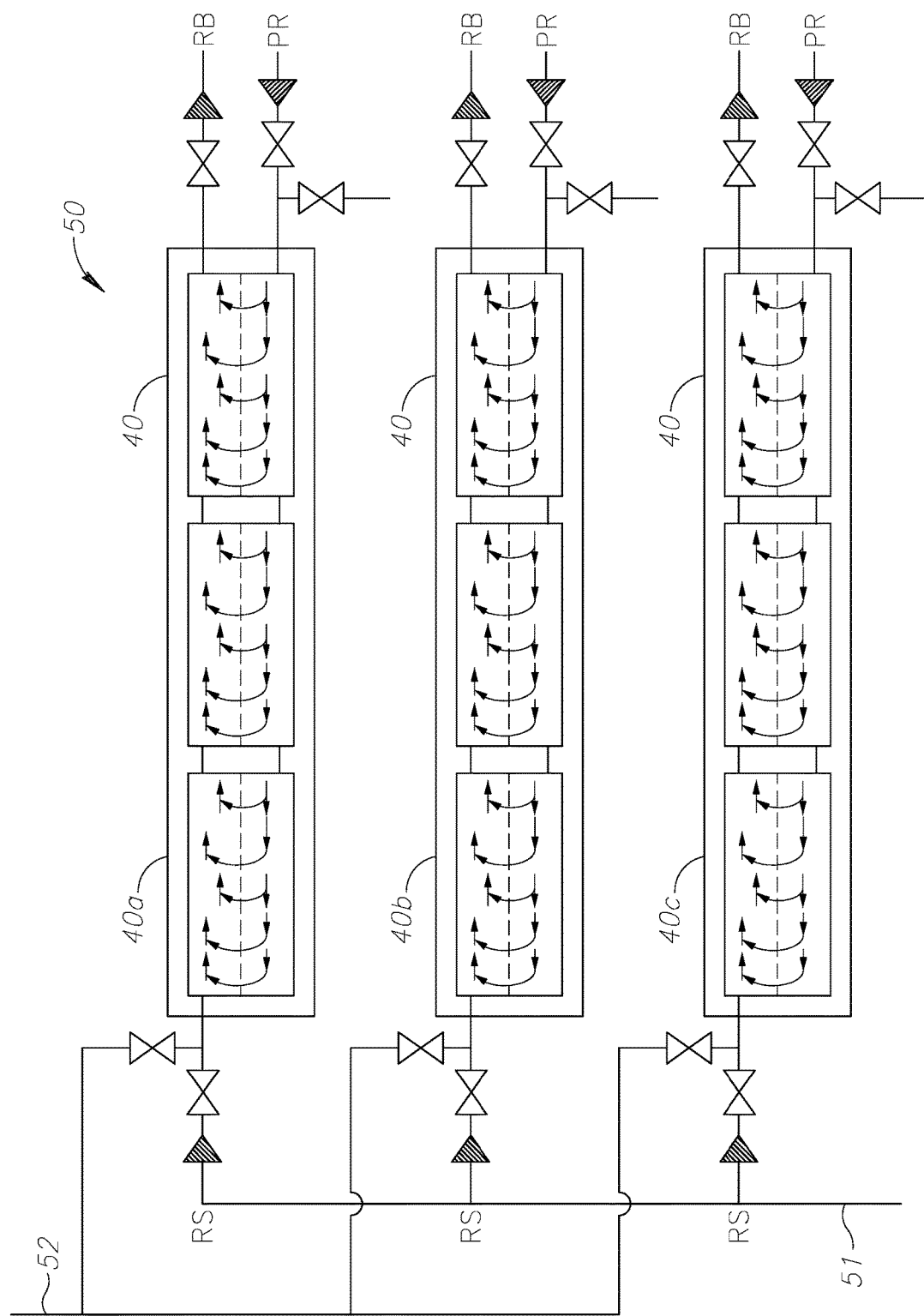
FIG. 10 is a diagrammatic illustration of a plant comprising a plurality of the pressure vessels of FIG. 6.

As shown in FIG. 10, a plurality of such systems 40 may be combined in a common plant 50, fed from a common feed stream supply 51 and backwash stream supply 52. The configuration shown in FIG. 10 is particularly advantageous in that the systems 40 can be operated in different modes. For example, element 40a may be operated in the second mode of operation, to clean fouling, while elements 40b, 40c are operated in the first production mode of operation. By providing a sufficient number of elements 40, and alternating the modes of operation of the plant element 40 in sequence, it will be apparent that a generally constant level of production may be maintained from the system 50 while avoiding the problems associated with fouling and system down time. The time of operation of the first mode of operation is approximately in the range 100 to 500 seconds and preferably in the range 200 sec to 300 sec. The required time to de-foul and recover the semi-permeable membrane 16 in the second mode of operation is approximately in the range 10 seconds to 60 seconds and more preferably 20 sec to 30 sec. Accordingly, it will be seen that for a relatively constant output, one system 40 out of every group of ten needs to be in the second, cleaning, mode of operation at any given time.

Although the method described herein has been particularly described with reference to PRO power generation, it will be apparent that it is applicable in any other type of plant or system using a semi-permeable membrane to provide osmosis or reverse osmosis operation.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Furthermore, it is to be understood that the invention can be carried out or practiced in various ways and that the invention can be implemented in embodiments other than the ones outlined in the description above.

Meanings of technical and scientific terms used herein are to be commonly understood as by one of ordinary skill in the art to which the invention belong, unless otherwise defined.

The invention claimed is:

1. A method of operating a pressure-retarded osmosis plant,
   the plant comprising at least one osmosis element having a semi-permeable membrane, the semi-permeable membrane defining a feed side and a permeate side of the at least one osmosis element,
   the method comprising, in a first mode of operation, opening a feed inlet valve to supply a feed stream having a relatively high concentration of solute through an inlet port to the feed side in a cross-flow configuration, opening a permeate stream inlet valve to supply a permeate stream having a relatively low concentration of solute through a single port of the permeate side in a dead end filtration flow configuration, and opening a feed outlet valve for receiving a feed outlet stream from the feed side through an outlet port wherein permeate has passed through the semi-permeable membrane from the permeate side to the feed side; and in a second mode of operation, closing the feed inlet valve and opening a backwash feed valve to supply a backwash stream having a relatively low concentration through the inlet port to the feed side of the at least one osmosis element in a cross flow configuration such that water flow direction is reversed and passes through the semi permeable membrane from the feed side to the permeate side, and closing the permeate stream inlet valve and opening a permeate stream outlet valve for receiving a permeate outlet stream through the single port of the permeate side, the method further comprising alternately performing the first mode of operation, to perform a production step, and performing the second mode of operation, to reverse the flow across the membrane and to perform a backwash step to reduce fouling of the semi-permeable membrane.

2. A method according to claim 1 wherein, in the second mode of operation, the supply of the backwash stream having a relatively low concentration to the feed side comprises mixing the feed stream having a relatively high concentration with a diluting stream having a relatively low concentration to produce the backwash stream having a low concentration.

3. A method according to claim 1 comprising closing the feed outlet valve in the second mode of operation.

4. A method according to claim 1 wherein the backwash stream is supplied from one or both of the feed inlet and the feed outlet.

5. A method according to claim 1 wherein the first mode of operation has a duration in the range of 100 sec to 500 sec.

6. A method according to claim 5 wherein the first mode of operation has a duration in the range of 200 sec to 300 sec.

7. A method according to claim 1 wherein the second mode of operation has a duration in the range of 10 sec to 60 sec.

8. A method according to claim 7 wherein and the second mode of operation has a duration in the range of 20 sec to 30 sec.

9. A method according to claim 1 wherein the gauge pressure of the feed steam and the gauge pressure of the backwash stream are approximately equal.

10. A method according to claim 1 wherein the gauge pressure of the feed stream and the osmotic pressure of the feed stream are approximately equal.

11. A method according to claim 1 wherein the at least one osmosis element of the plant comprises a plurality of osmosis elements comprising at least a first osmosis element and at least a second osmosis element, wherein the feed outlet of the first osmosis element is connected to a feed inlet of the second osmosis element.

12. A method according to claim 11 comprising supplying a separate permeate stream to at least two of said osmosis elements of said plurality of osmosis elements.

13. A method according to claim 12 wherein the gauge pressures of the separate permeate streams are different.

14. A method according to claim 11 wherein the plurality of osmosis elements are disposed in a pressure vessel.

15. A method of claim 14 wherein the plant comprises a plurality of pressure vessels, the method comprising operating the plant such that some of the pressure vessels are operating in the first mode of operation and some of the pressure vessels are operating in the second mode of operation.

16. A method according to claim 1 further comprising generating power by supplying a feed outlet stream from the feed outlet when the osmosis element is in the first mode of operation to a turbine.

* * * * *